United States Patent
Meunier et al.

(10) Patent No.: US 10,658,907 B2
(45) Date of Patent: May 19, 2020

(54) COMPACT ARCHITECTURE OF ELECTRIC POWER TRAIN FOR AUTOMOTIVE VEHICLE

(71) Applicant: RENAULT s.a.s., Boulogne-Billancourt (FR)

(72) Inventors: Fabrice Meunier, Boulogne Billancourt (FR); Herve Duval, Chatou (FR); Philippe E. Dubois, Le Mesnil Saint Denis (FR); Remi Oudart, Guyancourt (FR)

(73) Assignee: RENAULT s.a.s., Boulogne-Billancourt (FR)

( * ) Notice: Subject to any disclaimer, the term of this patent is extended or adjusted under 35 U.S.C. 154(b) by 281 days.

(21) Appl. No.: 15/529,876

(22) PCT Filed: Dec. 7, 2015

(86) PCT No.: PCT/FR2015/053341
§ 371 (c)(1),
(2) Date: May 25, 2017

(87) PCT Pub. No.: WO2016/092187
PCT Pub. Date: Jun. 16, 2016

(65) Prior Publication Data
US 2017/0264172 A1    Sep. 14, 2017

(30) Foreign Application Priority Data
Dec. 8, 2014 (FR) ..................................... 14 62053

(51) Int. Cl.
*H02K 11/33* (2016.01)
*B60K 1/00* (2006.01)
(Continued)

(52) U.S. Cl.
CPC .............. *H02K 11/33* (2016.01); *B60K 1/00* (2013.01); *H02K 5/22* (2013.01); *H02K 11/02* (2013.01);
(Continued)

(58) Field of Classification Search
CPC .......... H02K 11/33; H02K 11/02; H02K 5/22; B60K 1/00
See application file for complete search history.

(56) References Cited

U.S. PATENT DOCUMENTS

| | | | |
|---|---|---|---|
| 6,022,048 A * | 2/2000 | Harshbarger | B60K 6/40 180/299 |
| 2007/0273223 A1* | 11/2007 | Ward | B60K 6/365 310/72 |

(Continued)

FOREIGN PATENT DOCUMENTS

| | | | |
|---|---|---|---|
| DE | 10 2011 016 624 A1 | 10/2012 | |
| DE | 102011016624 A1 * | 10/2012 | ............ B60K 1/00 |

(Continued)

OTHER PUBLICATIONS

International Search Report dated Apr. 1, 2016 in PCT/FR2015/053341 filed Dec. 7, 2015.

(Continued)

*Primary Examiner* — Bryan A Evans
(74) *Attorney, Agent, or Firm* — Oblon, McClelland, Maier & Neustadt, L.L.P.

(57) ABSTRACT

An electric power train for an automotive vehicle includes an electric motor, a power electronics system, a first casing containing the power electronics system, a second distinct casing that contains the motor, and a third distinct casing. The first casing includes a bottom and an opening for access to the power electronics system. The second casing bears on an exterior wall of the first casing bottom. The opening is (Continued)

opposite the second casing. The third casing is assembled on the first casing and contains an electric filtering system. The first casing includes a platform, which juts out relative to at least one portion of the first casing and on a face of which platform an assembly contour for assembling the third casing on the first casing is defined. The assembly contour is substantially parallel to an axial direction of the motor. The platform overhangs the second casing.

8 Claims, 3 Drawing Sheets

(51) Int. Cl.
*H02K 5/22* (2006.01)
*H02K 11/02* (2016.01)
*H02K 7/00* (2006.01)

(52) U.S. Cl.
CPC .. *B60K 2001/001* (2013.01); *B60K 2001/006* (2013.01); *B60Y 2410/10* (2013.01); *H02K 7/006* (2013.01)

(56) References Cited

U.S. PATENT DOCUMENTS

| | | | |
|---|---|---|---|
| 2011/0163705 A1* | 7/2011 | Sato | H02K 11/024 318/400.24 |
| 2012/0286605 A1* | 11/2012 | Miyachi | B62D 5/0406 310/71 |
| 2014/0306563 A1* | 10/2014 | Oyama | H02M 1/12 310/71 |
| 2014/0354088 A1 | 12/2014 | Kannegaard Andersen et al. | |
| 2015/0211525 A1 | 7/2015 | Damm et al. | |

FOREIGN PATENT DOCUMENTS

| | | |
|---|---|---|
| EP | 1 523 087 A1 | 4/2005 |
| EP | 2 607 707 A1 | 6/2013 |

OTHER PUBLICATIONS

French Preliminary Search Report dated Oct. 9, 2015 in French Patent Application No. 1462053 filed Dec. 8, 2014.

* cited by examiner

COMPACT ARCHITECTURE OF ELECTRIC POWER TRAIN FOR AUTOMOTIVE VEHICLE

BACKGROUND

The object of the invention is power trains and more particularly power trains for vehicles with electric motorization. Such power trains generally comprise an electric motor placed in a dedicated casing and connected to a power electronics system, generally allowing the motor to be powered with alternating current from an electric accumulator battery, called traction battery. The power electronics system generally comprises an inverter allowing the direct current from the battery to be converted to alternating current and inversely to convert to a direct current, which allows the battery to be recharged, an alternating current coming from the motor, then acting as a generator. The power electronics system potentially comprises a charging rectifier making it possible to convert to direct current an alternating current coming from an external power supply network in order to recharge the battery. The charging rectifier can if necessary make the current to be rectified transit from the external network through certain coils of the motor. It can also take up all or some of the components of the inverter. Patent FR2943188 describes an architecture of such a charger.

The arrangement of the motor casings and of the casing or casings protecting the power electronics is generally obtained by superposing over the first casing dedicated to the motor, a casing dedicated to the inverter, another casing dedicated to the charger, and, in certain cases, another casing protecting an electric filter. The electric filter is a system making it possible to adjust the reactive power of the whole when the power train is connected to the external power supply network in order to recharge the battery. The external network typically powers an electric recharging terminal and also powers other types of electric installations. However, the filter and its connections with the power electronics device represent a significant part of the volume of the power train. The multiplicity of casings furthermore necessitates multiple sealing devices between the different casings and imposes the creation of machining areas that increase the overall volume of the whole, all the more so as casings are generally assembled in a substantially parallelepiped shape on a cylindrical face of the motor casing.

This arrangement by stacking and superposition over a cylindrical casing imposes the addition to the cylindrical casing of material for making the attachment areas. These attachment areas can prove to be fragile if a smaller addition of material is chosen. The vehicle becomes heavier if attachments are chosen that make it possible to withstand certain crash tests. The multiplicity of the casings does not simplify maintenance operations of the vehicle, and several casings sometimes have to be dismantled further in order to reach the one containing the unit to be replaced.

BRIEF SUMMARY

The aim of the invention is to propose an arrangement of the different casings that allows the overall size of the power train to be reduced, making it possible to limit the number of assembly and sealing areas between casings. The invention also aims to improve the structural strength of the power train and to simplify the assembly and/or maintenance operations.

For this purpose, the invention proposes an electric power train for automotive vehicle, comprising at least:
an electric motor,
a power electronics system,
a first casing containing the power electronics system,
a second casing distinct from the first casing and containing the motor.

The first casing comprises a bottom and an opening for access to the power electronics system, and the second casing bears on an exterior wall of the bottom of the first casing, whose opening lies opposite the second casing. The second casing can be made to bear on the first casing by means of parts, for example by means of interposed inserted sealing parts, these parts not however being casings in the meaning of hollow fairings containing electrical or mechanical subassemblies.

The power electronics system can typically comprise an inverter configured to supply the motor with alternating electric current from an electric accumulator battery, and can comprise a current rectifier. The inverter and the rectifier are preferably both situated in the first casing. "Power electronics" more generally means a system comprising electrical components and electronic components, and through which currents of several amperes transit, generally currents of more than about ten amperes, for the purpose of changing the characteristics of these currents in order to power electrical devices. The opening faces the bottom of the casing on which the components of the power electronics system are secured, for example, on which an inverter and/or a current rectifier, or at least a part of the inverter and/or the rectifier, are secured, for example a capacitor associated with the inverter or with the rectifier.

The first and the second casing are therefore configured to be assembled so as to abut one against the other along a first interfacing direction, which is substantially parallel to a direction allowing the inverter and the rectifier to be extracted from the first casing. This first interfacing direction can be the axial direction of the motor, parallel to the axis of rotation of the motor. The second casing abuts on an exterior wall of the bottom of the first casing.

According to a preferred embodiment, the assembly areas between the first and the second casing are dimensioned so that the two assembled casings form a self-supporting structure able to be lifted by one casing or the other. Assembly areas between the first and the second casing mean the areas of the first or of the second casing that make it possible to assemble these casings together. Advantageously, at least one securing point of the power train on the vehicle is provided on the first casing and at least one securing point of the power train on the vehicle is provided on the second casing.

Advantageously, the power train furthermore comprises an electric filtering system, and comprises a third casing distinct from the first and from the second casing, containing the filter and assembled on the first casing. The electric filtering system is typically connected upstream of the charging rectifier of the power electronics system. The electric filtering system is for example an electric system configured to limit the reactive power of the battery being recharged, and to allow the power supply battery to be recharged from a power supply network, external to the vehicle, delivering an alternating current. The third casing is preferably assembled on the first casing so that it can be statically supported by the first casing alone, independently of the second casing. Statically means from the viewpoint of static equilibrium, potentially not taking account of vibration phenomena. Indirect connections can be provided between second and third casing, for example by means of at least one part simultaneously connected to the third and to the second casing, and making it possible to change the vibration modes of the assembly of the three casings, hence of the power train. There is preferably no direct contact between the third casing and the second casing. The third casing can therefore easily be handled as a unit of a subassembly combining the first and the second casing. The opening in the first casing can advantageously be closed by a cover, the cover preferably being substantially perpendicular to the axial direction of the motor. The cover is preferably independent of the second casing and of the third casing.

According to an advantageous embodiment, the third casing has an upper face and a lower opening, the third casing being assembled so as to press the contour of the lower opening against a dedicated assembly contour located on the first casing. The volume contained in the third casing is therefore closed by a surface of the first casing. Upper face here is the designation of a face lying opposite the opening designated as lower opening. In the configurations where the face and the opening are opposite each other, embodiment variants can be envisaged in which the upper face would not be horizontal, neither would it be situated in an upper part relative to the third casing, and/or would not be situated in an upper part relative to the assembly of the three casings.

According to a preferred embodiment, the assembly contour of the third casing is substantially parallel to the axial direction of the motor. This means that this contour is parallel, to within 10%, to a geometric plane containing a geometric direction parallel to the axis of rotation of the motor.

In other words, the third casing is assembled on the first casing so as to abut on the first casing along a second interfacing direction, which is substantially perpendicular to the first interfacing direction, that is to say perpendicular, to within 10%, to the axial direction of the motor. The second interfacing direction can be, for example, the vertical direction if the axis of rotation of the motor is placed horizontally.

Advantageously, once assembled, the third casing and the first casing have an axial overlap along this second interfacing direction, that is to say that at least one portion of the first casing and at least one portion of the third casing have common coordinates along the axis corresponding to the second interfacing direction. The third casing is preferably assembled on the first casing so that one portion of the first casing is interposed between the third casing and the second casing. The third casing is then assembled along a direction of assembly that tends to bring the third casing closer to the assembled position of the second casing. According to another embodiment variant, the third casing is assembled on the first casing so as to interpose the third casing between the first casing and the second casing. The third casing is then assembled along a direction of assembly that tends to bring the third casing closer to the assembled position of the second casing.

According to a particularly advantageous embodiment, the first casing comprises a platform, which juts out relative to at least one portion of the first casing. A contour for assembling the third casing on the first casing can be defined on a face of the platform. The third casing therefore preferably overhangs the second casing. The platform preferably extends both along a direction parallel to the first interfacing direction and along another direction perpendicular both to the first interfacing direction and to the second interfacing direction. Preferably: the platform is interposed between almost the totality of the projected surface of the third casing visible from the second casing, and the second casing. Almost the totality means more than 70% of the projected surface.

According to a preferred embodiment, the platform includes a portion of a substantially rectangular shape, the short side of the rectangle being parallel to the axial direction of the motor. When the dimensions of the filter allow it, the extent of the jutting-out distance of the platform is thus limited, which can be dimensioned to support a lower load along its encasement line than if the jutting-out distance were longer.

According to a preferred embodiment, the first casing comprises a one-piece part defining at least one housing accessible through the opening and limited by the bottom of the casing. This one-piece part also defines the platform intended for assembling the third casing. According to a preferred embodiment, the one-piece part can be made in metal, for example by foundry techniques. The one-piece part then acts both as a structural part and provides a screen effect relative to the electromagnetic emissions from the electronic components that it contains. Embodiment variants can be envisaged in which the one-piece part would be made, for example in plastic material resistant to high temperatures, for example, coated with a conductive layer to ensure the effect of an electromagnetic screen.

The platform, seen in cross-section perpendicular to the first interfacing direction, in other words seen in cross-section perpendicular to the mean plane of the platform, can have at least locally a hollow beam profile or a U-shaped beam profile. The opening of the U-shaped profile or profiles is preferably turned towards the third casing, such that, once the third casing is assembled on the platform, the platform behaves in flexion like a hollow beam with a closed cross-section.

Advantageously, the electrical connections between the units contained in at least a first of the two casings and at least a second of the two casings are made by means of connectors, a first portion of which is integral with the first of the two casings and a second portion of which is integral with the second of the two casings. These electrical connections therefore do not require any cable exterior to the first or to the second casing, as all the electrical conductors are contained in the first of the two casings or in the second of the two casings. According to an embodiment, at least some of the conductors inside the casings are made in a rigid form and are integral with the casing, which contains them. According to a preferred embodiment, the only electrical connections between the three casings are made by a first group of rigid connectors integral in part with the first casing and in part with the third casing, and a second group of rigid connectors integral in part with the first casing and in part with the second casing.

The first casing can comprise channels capable of circulating fluid, located on a face of the first casing common with the second casing. The circulation of fluid can be used to cool the casing.

According to another aspect, the invention proposes a casing for a power train electrical subassembly, comprising:
 a housing including a bottom and an opening, the opening being surrounded by a flange on which a cover extending substantially along a first geometric plane can be assembled,
 at least one first interfacing area making it possible, on a face exterior to the housing, to bring to bear and to secure a second casing,
 an assembly platform substantially perpendicular to the first geometric plane and substantially perpendicular to the first interfacing area, overhanging an available volume facing the first interfacing area or overhanging a second casing assembled on the first interfacing area. The housing preferably has dimensions making it possible to accommodate at least one inverter and/or at least one rectifier of electric current. The housing can furthermore include electrical connections integrated and suitable for accommodating the inverter and the rectifier. The interfacing area can be a substantially flat area, or an area configured to receive a flat cover on which the second casing can come to bear.

The interfacing area preferably includes one or several flat areas.

To ensure that the platform can be perpendicular to both the cover and the flat interfacing area, the cover and the flat interfacing area must of course have a common direction (a straight line direction parallel to a same geometric straight line). The plane of the cover is preferably parallel to the mean plane of the first flat interfacing area. However, it is also possible to envisage embodiment variants in which the plane of the cover is perpendicular to the mean plane of the first flat interfacing area, the platform overhanging a portion of space facing the interfacing area. The inside of the first casing can then be laterally accessible relative to an axial direction of the motor. Mean direction of the first flat interfacing area means the direction of plane perpendicular to the interfacing direction of a second casing, which would be of a shape suitable for being assembled on the first casing. The first flat interfacing area is preferably entirely contained in a same geometric plane. However, other embodiment variants can be envisaged, for example, the first flat interfacing area can comprise several portions of parallel planes, or can comprise several portions of planes inclined in the opposite directions relative to the interfacing direction of the second casing.

The platform preferably comprises at least one second flat interfacing area making it possible to bring to bear and to secure a third casing on one of the faces of the platform. Advantageously, the platform includes a portion in the shape of a bowl, the second flat interfacing area surrounding the bowl so as to make it possible to bring to bear and secure a third casing on the flanges of the bowl. In fact, the bowl forms a beam with a u-shaped cross-section, encased at one of its ends.

BRIEF DESCRIPTION OF THE DRAWINGS

Some aims for characteristics and advantages of the invention will emerge on reading the following description, given only as non-limitative examples and made with reference to the attached drawings, in which.

DETAILED DESCRIPTION

Figure 1:
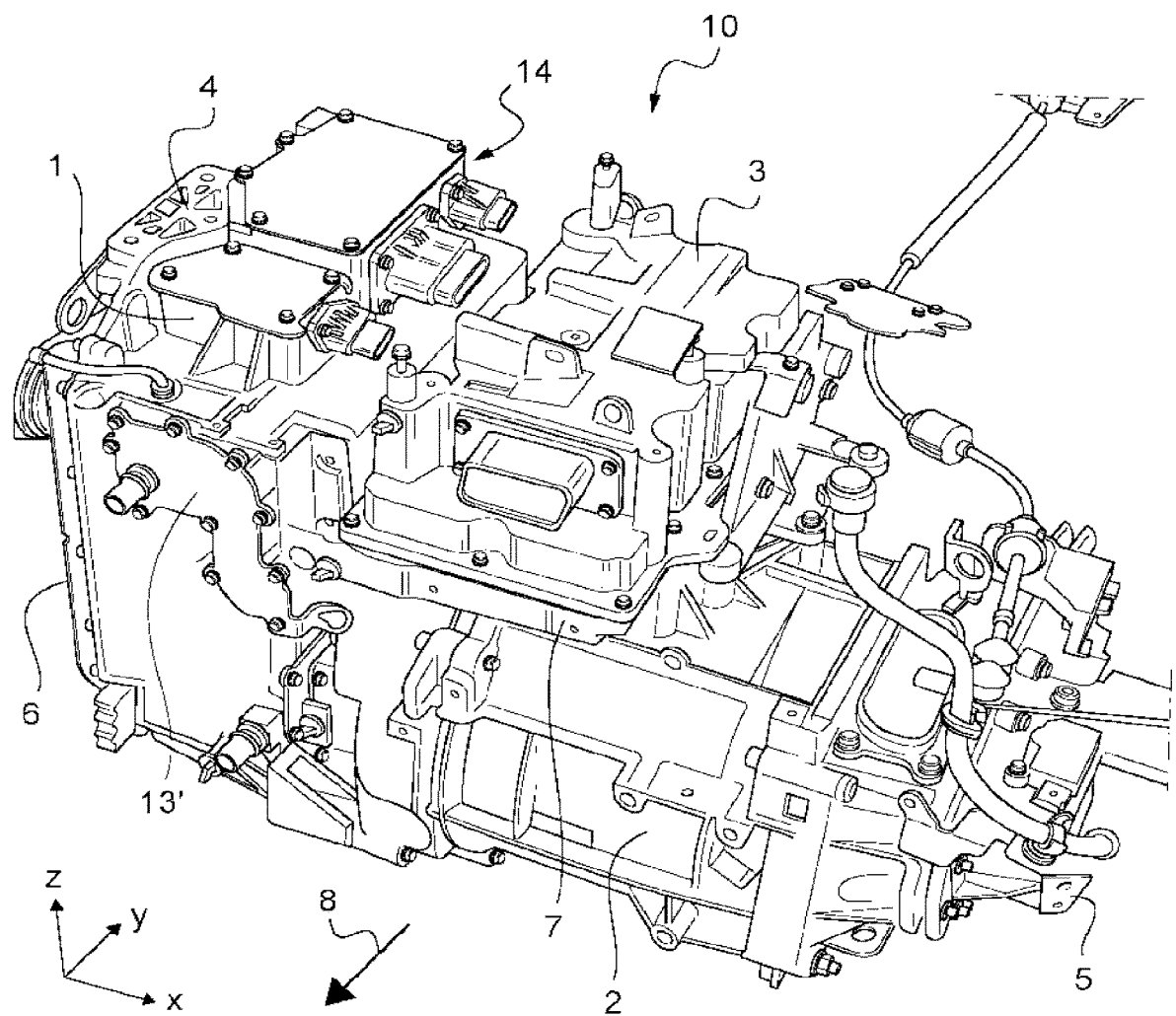
FIG. 1 is a general perspective view of a power train according to the invention

As illustrated in FIG. 1, a power train 10 comprises a power electronics system contained in a main housing 20 of a first casing 1, comprises an electric motor mechanically connected to the wheels of the vehicle and accommodated in a second casing 2, and also comprises an electric filtering system accommodated in a third casing 3. The power electronics system, the electric filter and the motor are not directly visible in the figures. In the figures, the orientations of the power train are identified in relation to axes x, y, z, where y is the longitudinal direction or forward travel direction of the vehicle, x is the transverse direction of the vehicle and z is the vertical direction. The motor axis is situated along the transverse direction x. The terms horizontal, vertical here are taken to be with reference to the orientation of the motor, which is assumed to be positioned as it is in the vehicle, with its axis of rotation parallel to the transverse direction x of the vehicle. The first and the second casing are assembled so as to come into contact with each other along an exterior wall 8 of a bottom 21 of the main housing 20 of the first casing.

Figure 3:
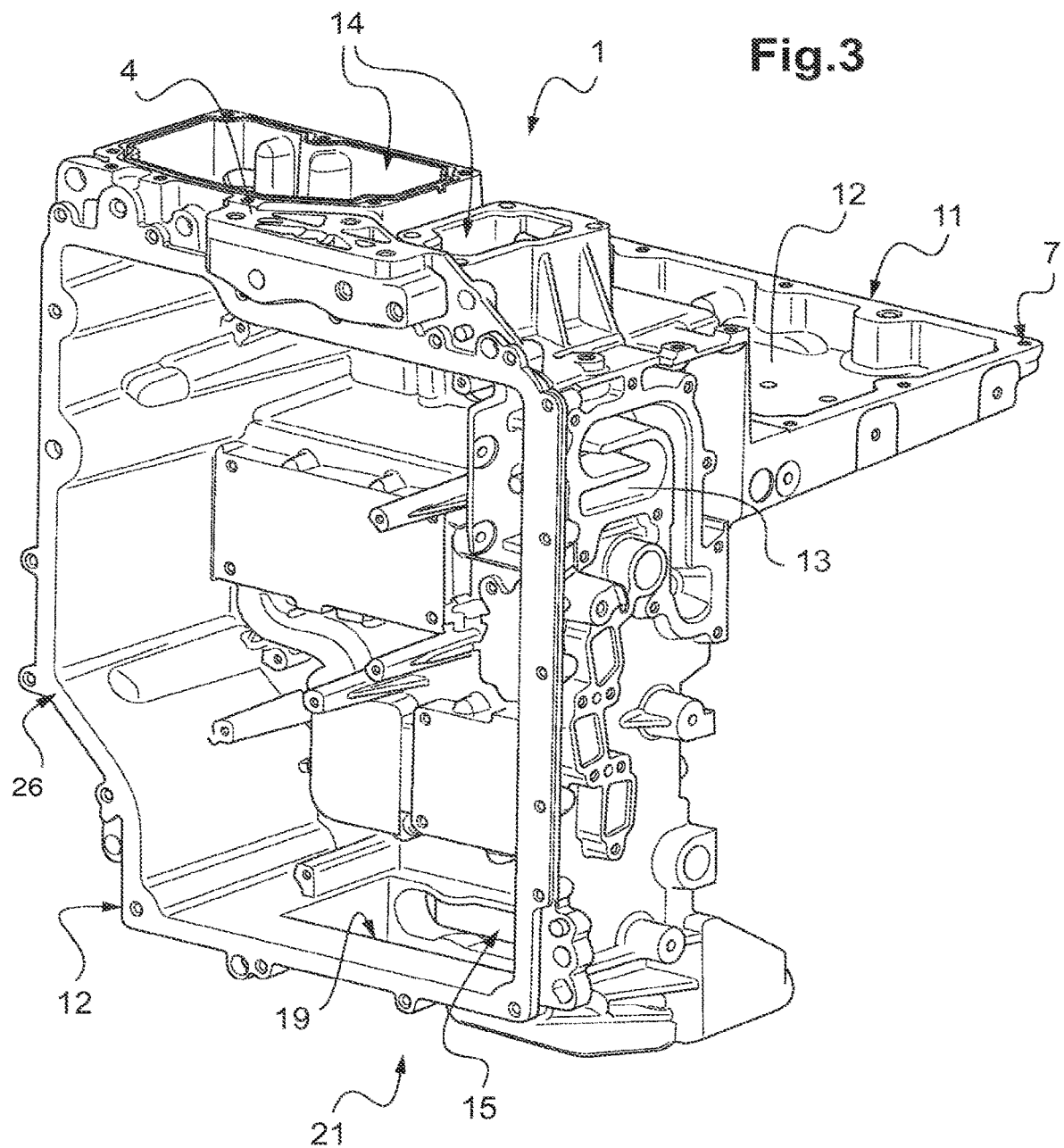
FIG. 3 is a perspective view of a unit of the power train of FIG. 1 along a different viewing angle from that of FIG. 1.

This exterior wall 8 is oriented along an assembly plane substantially parallel to the geometric plane defined by the axes y, z. The cover 6 of the first casing 1 covers an opening 25 axially oriented opposite the bottom 21 of the first casing 1. The cover 6 bears on a flange 26 of the opening 25 (visible in FIG. 3).

The cover 6 of the first casing 1 is also situated along a plane substantially parallel to a geometric plane y, z, that is to say parallel to the wall 8 of the bottom 21 of the first casing on which the second casing comes into abutment. When the three casings occupy their final assembled position on the vehicle, the direction x thus corresponds simultaneously to the direction along which the motor could be extracted from its casing, to the assembly direction of the second casing on the first casing and to the direction along which the different components of the power electronics system could be extracted from the casing 1, all this provided that the first and the second casing are momentarily isolated, respectively from its cover and from the first casing, while occupying the same spatial orientation. In practice, in order to access the power electronics units contained in the first casing, the axis of the power train can be pivoted to bring the motor axis closer to the vertical. The second casing can have a substantially cylindrical shape of axis x. The first casing can have an assembly face 8 acting both as an assembly stop for the second casing and as a cover for the second casing. This face 8 can be parallel to the cover 6 of the first casing. Once assembled, the first and the second casing form a self-supporting structure, which allows the power train 10 to be secured to the vehicle by attachment points distributed in part on the first casing, for example by at least one attachment point 4 in upper part of the first casing, and in part on a reduction gearbox casing 28 assembled in turn at the other axial end of the motor casing 2, for example by means of at least one attachment point 5 situated towards the axial end of the reduction gearbox casing.

According to an advantageous embodiment, the first casing includes a platform 7, which overhangs the second casing and on which the third casing 3 comprising the electric filter is assembled. The electric filter is therefore contained in a volume delimited in lower part by the platform 7 and delimited in upper part by the third casing 3. The third casing 3 is closed on an upper face of the platform along a closing contour 24 contained in an assembly plane 11, which is substantially horizontal. The third casing 3 has an upper face 22 and a lower opening 23. The third casing 3 is assembled so as to press a contour of the lower opening 23 against a dedicated assembly contour 24 located on the first casing 1.

According to a preferred embodiment, the platform 7 is separated from the second casing by a non-zero vertical distance (distance along the direction perpendicular to the platform), which simplifies the maneuvers of assembling the second casing on the first casing. The width of the platform along the transverse direction y is substantially equal to the total width, along this axis, of the main housing 20 in which are contained the power electronics units, and in particular in which are contained an inverter and/or a current rectifier associated with the motor. Total width means the cumulative width of the housing and of the walls that define it. The first casing 1 can comprise, in addition to the main housing 20, secondary housings, which are accessible for example through the upper part of the casing 1. Electrical or electronic units other than the inverter and the rectifier can therefore be inserted in these secondary housings 14 along a vertical insertion direction. These secondary housings can be closed by dedicated covers distinct from the cover 6 of the main housing. In known configurations distinct from the invention, the inverter as well as the rectifier are generally each connected in a conventional manner to a capacitive system of non-negligible dimensions, and are each installed in a dedicated casing with their associated capacitive system. In the embodiments according to the invention proposed in FIGS. 1 to 3, the first casing 1 includes a main housing 20 accessible through the cover 6, and whose dimensions make it possible to accommodate simultaneously the inverter, the current rectifier and their associated capacitors, together with a direct current to direct current converter. The transverse width of the first casing is larger than or equal to the transverse width of the motor casing 2, and the dimension of the housing along the axis z is larger than the diameter of the motor casing, so as to be able to accommodate both the inverter and the rectifier and to be able to support the platform 7 at a distance from the motor casing 2. In this configuration, the contents of each of the casings can be inspected separately, dismantling only the casing concerned or dismantling only its cover. It is no longer necessary to secure casings on the cylindrical face of the motor casing. This generally leads to difficult compromises between an increased weight of the motor casing, in order to obtain the securing points for the additional casing to be assembled, and a fragility of the assembly if the additional casing is assembled on supports dimensioned to the minimum. The power train configuration according to the invention thus makes it possible both to simplify the assembly of the power train, to simplify the maintenance of each of the components, motor, power electronics, filter, and makes it possible to obtain a self-supporting structure displaying good strength in the event of an impact of the vehicle at the motor.

Figure 2:
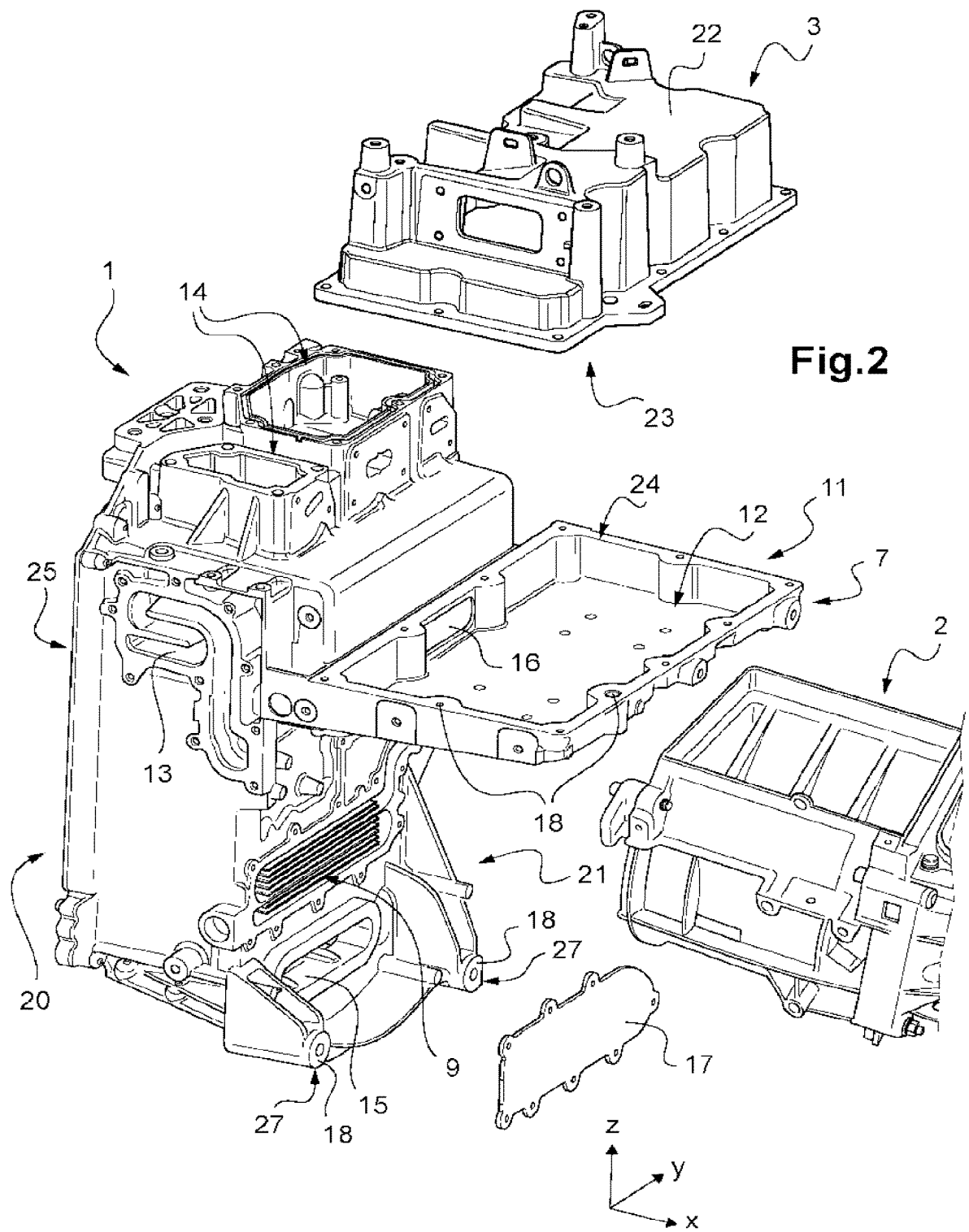
FIG. 2 is an exploded view of some of the units of the power train of FIG. 1

FIG. 2 illustrates, in an exploded form, the first casing, the second casing and the third casing in their final assembly orientation in the vehicle. FIG. 2 repeats units common with FIG. 1, the same units being designated by the same reference numbers. It is possible to note in FIG. 2 the presence of cooling circuits 9 and 13 located in the exterior walls of the first casing 1. The cooling circuit 13 is located in a wall that remains free following the assembly of the first, the second and the third casing together. The circuit 13 is closed by a cover 13'visible on FIG. 1. The circuit 9 is closed by a cover 17 visible on FIG. 2. The cooling circuit 9 is situated on the exterior of the wall 8 of the bottom 21 of the first casing, at the interfacing face between the first and the second casing. This circuit 9 is closed by a closing plate 17 and is therefore interposed between the first and the second casing. In the illustrated example, the assembly of the third casing and the second casing on the first casing is done by means of screws that are fitted in threaded holes 18 arranged on the perimeter of the housings defined by the third casing and by the second casing. The machined flats 27 surrounding the threaded holes 18 of the first casing that allow the second casing to be secured to the first casing form flat areas for interfacing the second casing on the first casing. In certain configurations, the wall 8 of the bottom of the first casing, once it is covered by the cover 17, can also be considered as another flat area for interfacing the second casing on the first casing, that is to say a flat area by means of which the second casing comes into abutment on the first casing. Embodiment variants can be envisaged in which the areas for interfacing the second casing on the first casing are not flat. The second casing can for example come to bear on the first casing by means of interfacing areas that are situated laterally on either side of the first casing and/or by means of curved interfacing areas.

Also to be noted on the first casing are orifices forming a first passage 15 for cables and a second passage 16 for cables. The first passage 15 for cables is situated on the bearing face of the first casing on which the second casing comes to bear. This bearing face corresponds here to the bottom 21 of the first casing. However, embodiment variants can be envisaged in which the second casing comes to bear, not on the bottom, but on a side wall of the first casing, in which case the corresponding connector passage will be located on this same side wall. The second passage for cables is situated on the face of the first casing supporting the platform 7. In the illustrated example, the passage 16 for cables is situated inside a recess 12 located in the platform 7. This recess 12 assists with defining the volume available for the electric filter protected by the casing 3. Embodiment variants can be envisaged in which the passage 16 for cables is situated on the same face of the first casing as that which supports the platform 7, without being directly integrated with the interior of the platform 7. The passages 15 and 16 for cables can be dimensioned so as to be able to secure respectively to them a complementary connector unit of a connector unit assembled respectively on the second or the third casing. The connector units can be configured to provide the electrical connections between the two casings by simply switching on two connector units. The recess 12 of the platform makes it possible to give the platform, in the plane y z, a shape of a hollow beam with a u-shaped cross-section. Good rigidity of the platform is thereby obtained without excessively increasing the weight of the first casing. Once the third casing 3 is assembled on the platform, a hollow beam is obtained with a closed cross-section, encased by the platform base, and which makes it possible efficiently to support the filter contained in the casing while limiting the overall weight of the whole power train.

The invention is not limited to the described embodiment examples and can be declined into numerous variants. A first casing can be envisaged that contains the inverter and the rectifier and which does not include annex housings 14 in upper part. A platform can be envisaged, which instead of being interposed between the casing 3 and the motor, would support a casing 3 that would be interposed between the platform and the motor. Embodiment variants can be envisaged, having no cooling channels on the free exterior face of the casing 1, or having no cooling channels on the common face 1 between the casing 1 and the casing 2. Embodiment variants can be envisaged in which only one of the two power electronics units would be accommodated behind the vertical cover 6 of the casing 1, the other power electronics unit being accommodated in a housing 14 accessible from the top of the casing 1. The platform can be anchored down through its end by an add-on part (not shown), for example, a plate connecting the end of the platform to the second casing, in order to limit the vibration amplitudes of the platform when the vehicle is being driven. The first casing can comprise other openings than those facing the bottom, for example the passage 15 for cables between the first and the second casing, and/or a lower opening 19 authorizing access to the inverter from underneath the vehicle.

The arrangement of casings according to the invention makes it possible to simplify access to each component of the power train, to achieve a better compromise between structural strength of the whole, particularly against impact, and weight of the whole, and to reduce the lengths of connection units connecting the electrical or electronic units of one casing to those of the neighboring casing.

The invention claimed is:

1. An electric power train for automotive vehicle, comprising:
    an electric motor;
    a power electronics system;
    a first casing containing the power electronics system;
    a second casing distinct from the first casing and containing the motor, the first casing comprising a bottom and an opening for access to the power electronics system, said opening facing said bottom, the first and second casings being configured to be assembled in such a way as to abut against one another in a direction of abutment parallel to the axis of rotation of the motor, the second casing bearing on an exterior wall of the bottom of the first casing, and the opening lying on an opposite side of the bottom of the first casing from the second casing; and
    a third casing distinct from the first casing and from the second casing, the third casing being assembled on the first casing and containing an electric filtering system connected upstream of the charging rectifier, the first casing comprising a platform, which juts out relative to at least one portion of the first casing and on a face of which platform an assembly contour for assembling the third casing on the first casing is defined, said assembly contour being comprised in an assembly plane which is substantially parallel to the axis of rotation of the motor, said platform overhanging said second casing.

2. The power train as claimed in claim 1, wherein assembly areas between the first casing and the second casing are dimensioned so that, when assembled, the first casing and the second casing form a self-supporting structure able to be lifted by the first casing or the second casing.

3. The power train as claimed in claim 1, wherein the third casing has an upper face and a lower opening, the third casing being assembled so as to press a contour of the lower opening against said assembly contour located on the first casing.

4. The power train as claimed in claim 1, wherein the first casing comprises a one-piece part defining at least one housing accessible through the opening and limited by the bottom of the first casing, the one-piece part also defining the platform for assembling the third casing.

5. The power train as claimed in claim 1, wherein the platform, in a cross-section perpendicular to a mean plane of the platform, has at least locally a hollow beam profile or a U-shaped beam profile.

6. The power train as claimed in claim 1, wherein the first casing comprises channels to circulate fluid, located on a face of the first casing in common with the second casing.

7. The power train as claimed in claim 1, wherein the platform is separated from the second casing by a non-zero distance.

8. The power train as claimed in claim 1, wherein the platform includes a recess on an upper face surrounded by a closing contour that is planar and is raised with respect to the recess.

* * * * *